Patented Jan. 9, 1940

2,186,226

UNITED STATES PATENT OFFICE 2,186,226

AZO DYESTUFFS INSOLUBLE IN WATER

Werner Zerweck and Ernst Heinrich, Frankfort-on-the-Main-Fechenheim, Germany, assignors to General Aniline Works, Inc., New York, N. Y., a corporation of Delaware No Drawing. Application July 14, 1938, Serial No. 219,203. In Germany July 19, 1937

1 Claim. (Cl. 260—204)

The U. S. Patent No. 2,025,582 relates to water insoluble azodyestuffs of the general formula:

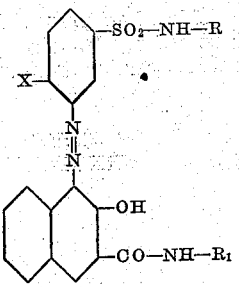

wherein X means an alkyl or alkoxy group, R stands for hydrogen, an alkyl, benzyl, a completely hydrogenated hydroaromatic radical or a radical of the benzene series and $R_1$ stands for a radical of the benzene or naphthalene series. According to U. S. Patent No. 2,025,582 these dyestuffs may be used for preparing lakes fast to oils and for incorporating them with rubber products, whereby red dyeings of very good fastness to light and to vulcanization are obtained. Furthermore it is stated in the cited patent that the good properties of the dyestuffs are surprising because the diazo compounds of the bases which are comprised by the above formula are unsuitable for the preparation of dyeings on the fiber since a great part of the dyestuffs is removed from the fiber even by soaping at the boil.

The present invention relates to certain embodiments of the above mentioned series of dyestuffs which are distinguished from the dyestuffs described in the U. S. Patent 2,025,582 by the property that they yield, when produced on vegetable fibers, valuable dyeings and printings which possess in contradistinction to the statement in the cited patent a good fastness to boiling, soaping and washing.

More particularly, the present invention relates to azodyestuffs of the general formula:

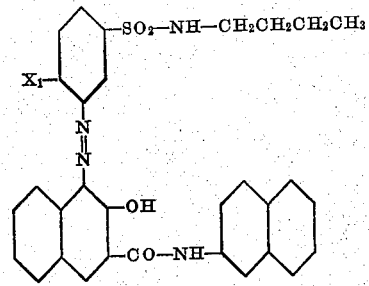

wherein $X_1$ stands for a member selected from the group consisting of hydrogen, halogen and alkyl, alkoxy and aryloxy groups.

The new dyestuffs are obtained by impregnating vegetable fibers according to the usual methods with 2-(2'-3'-hydroxy-naphthoylamino)-naphthalene and combining this compound on the fiber with a diazo compound of an amine of the following formula:

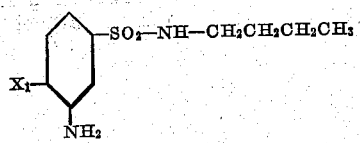

wherein $X_1$ has the above signification. The dyeings and printings thus obtained are distinguished by clear bright red shades and by a good fastness to boiling, soaping and washing, and by a very good fastness to light.

Dyeings and printings distinguished by these good properties have never been obtained before by combining 2-(2',3'-hydroxynaphthoylamino)-naphthalene with other diazo compounds. Thus, for example, the dyeings obtained by combining 2-(2',3'-hydroxynaphthoylamino)-naphthalene with diazo compounds of 2-amino-4-chloro-toluene, 2-amino-4-chloroanisole or 2-amino-4-chlorodiphenylether are surpassed by the dyeings obtained according to the present invention by better fastness to light. The dyeings prepared by employing 1-methoxy-2-amino-benzene-4-sulfonic acid n-butylamide as diazo component are distinguished from those obtained with the isomeric 1-methoxy-2-aminobenzene-4-sulfonic acid diethylamide by considerably brighter shades and better fastness to light.

In order to further illustrate our invention the following example is given, the parts being by weight and all temperatures in degrees centigrade.

Example 50 grams of boiled cotton yarn are treated with the impregnating bath (a) for half an hour, then freed from the adhering liquid by winding, squeezing or centrifuging and, while wet, dyed in the developing bath (b) for half an hour. Then the dyed goods is rinsed, soaped at the boil, rinsed once more and dried.

Impregnating bath (a)

2 grams of 2-(2',3'-hydroxynaphthoylamino)-naphthalene, 6 ccs. of caustic soda lye of 34° Bé., 4 ccs. of Turkey red oil of 50% strength and 2 ccs. of formaldehyde of 30% strength are dissolved in about 500 ccs. of boiling water. Then the solution is made up to 1 liter by the addition of water.

*Developing bath (b)*

2.6 grams of 1-methoxy-2-aminobenzene-4-sulfonic acid n-butylamide of melting point 103° of the formula:

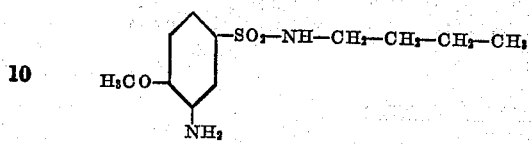

are diazotized in the usual manner with 0.7 g. of sodium nitrite and 2.8 ccs. of hydrochloric acid of 22° Bé. To the diazo solution obtained 2.5 grams of sodium acetate and a solution of 25 grams of sodium chloride in water are added and the solution is made up to 1 liter.

In the above described manner bright red shades of good fastness to washing and boiling and very good fastness to light are obtained.

Similar bright shades are obtained according to one of the usual printing methods.

By employing as diazo component in the above example instead of 1-methoxy-2-aminobenzene-4-sulfonic acid n-butylamide the corresponding amount of 1-methyl-2-aminobenzene-4-sulfonic acid n-butylamide, clear yellowish red shades of equally good fastness properties are obtained.

Similar valuable dyeings are obtained by employing 1-chloro-2-aminobenzene-4-sulfonic acid n-butylamide, 1-phenoxy-2-aminobenzene-4-sulfonic acid n-butylamide or 1-aminobenzene-3-sulfonic acid n-butylamide or 1-(4'-chlorophenoxy)-2-aminobenzene-4-sulfonic acid n-butylamide as diazo components.

We claim:

The azodyestuff of the formula:

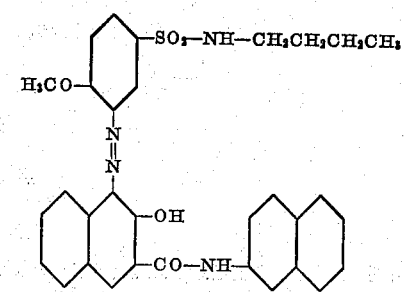

which dyestuff yields when prepared on the vegetable fiber bright red shades of good fastness to washing and boiling and very good fastness to light.

WERNER ZERWECK.
ERNST HEINRICH.